(12) United States Patent
Izutsu et al.

(10) Patent No.: US 7,379,967 B2
(45) Date of Patent: May 27, 2008

(54) DOWNLOAD METHOD FOR FILE BY BIT TORRENT PROTOCOL

(75) Inventors: Masahiro Izutsu, Nagaokakyo (JP); Kunihiko Nakada, Osaka (JP); Michimasa Suzawa, Osaka (JP)

(73) Assignee: Grid Solutions, Inc., Tokyo (JP)

( * ) Notice: Subject to any disclaimer, the term of this patent is extended or adjusted under 35 U.S.C. 154(b) by 324 days.

(21) Appl. No.: 10/546,297

(22) PCT Filed: Jan. 28, 2005

(86) PCT No.: PCT/JP2005/001254

§ 371 (c)(1),
(2), (4) Date: Sep. 12, 2005

(87) PCT Pub. No.: WO2006/080083

PCT Pub. Date: Aug. 3, 2006

(65) Prior Publication Data

US 2007/0028133 A1    Feb. 1, 2007

(51) Int. Cl.
    *G06F 15/16*    (2006.01)
(52) U.S. Cl. ............... 709/204; 709/205; 709/206; 709/207
(58) Field of Classification Search ............ 709/204, 709/205, 206, 207
    See application file for complete search history.

(56) References Cited

U.S. PATENT DOCUMENTS

| 7,096,230 B2* | 8/2006 | Kraft ............ 707/102 |
| 2001/0027479 A1* | 10/2001 | Delaney et al. ......... 709/216 |
| 2004/0117376 A1* | 6/2004 | Lavin et al. ............ 707/10 |

FOREIGN PATENT DOCUMENTS

| EP | 0 993 163 A1 | 4/2000 |
| JP | A 2002-269461 | 9/2002 |
| JP | A 2003-6087 | 1/2003 |
| JP | A 2003-99315 | 4/2003 |
| JP | A 2003-187101 | 7/2003 |
| JP | A 2003-228668 | 8/2003 |
| JP | A 2003-273898 | 9/2003 |
| JP | A 2003-283567 | 10/2003 |
| JP | A 2003-323329 | 11/2003 |
| JP | A 2004-30610 | 1/2004 |
| JP | A 2004-146973 | 5/2004 |
| WO | WO 01/13201 A2 | 2/2001 |

* cited by examiner

*Primary Examiner*—Lana Le
*Assistant Examiner*—Adel Youssef
(74) *Attorney, Agent, or Firm*—Oliff & Berridge, PLC

(57) ABSTRACT

The present invention relates to the improvement of the Bit Torrent protocol, which is one of the P2P protocols. A seeder flag is added to the active peer table. First a super seeder having the original is activated, and the super seeder is stopped when the total value of the seeder flags (number of activated seeders) reaches a certain level. The super seeders are activated only when the seeders having the original of a file are insufficient on the network, and are stopped when excessive. By this dynamic control, the number of activated processes of the super seeders can be decreased.

9 Claims, 7 Drawing Sheets

ACTIVE PEER TABLE
(ONE TABLE IS GENERATED FOR EACH FILE)

| CLIENT ADDRESS (IP, PORT) |
| --- |
| IP 1, PORT 1 |
| IP 2, PORT 2 |

FIG. 5

ACTIVE PEER TABLE
(ONE TABLE IS GENERATED FOR EACH FILE)

| CLIENT ADDRESS (IP, PORT) | SEEDER FLAG |
|---|---|
|  |  |
|  |  |
| TOTAL VALUE |  |

FIG. 6

SUPER SEEDER TABLE

| SERVICER ID | ADDRESS (IP) |
|---|---|
| CORP 1 | 200. 0. 0. 2 |
| CORP 1 | 200. 0. 0. 3 |
| CORP 2 | 210. 1. 1. 2 |
| CORP 2 | 210. 1. 1. 3 |

FIG. 7

ACTIVE PEER TABLE
(ONE TABLE IS GENERATED FOR EACH FILE)

| CLIENT ADDRESS (IP, PORT) | SEEDER FLAG |
|---|---|
| 100. 0. 0. 2 | 0 |
|  |  |
| TOTAL VALUE | 0 |

FIG. 8

ACTIVE PEER TABLE
(ONE TABLE IS GENERATED FOR EACH FILE)

| CLIENT ADDRESS (IP, PORT) | SEEDER FLAG |
|---|---|
| 100. 0. 0. 2 | 0 |
| 200. 0. 0. 2 | 1 |
| TOTAL VALUE | 1 |

FIG. 9

ACTIVE PEER TABLE
(ONE TABLE IS GENERATED FOR EACH FILE)

| CLIENT ADDRESS (IP, PORT) | SEEDER FLAG |
|---|---|
| 100. 0. 0. 2 | 1 |
| 200. 0. 0. 2 | 1 |
| TOTAL VALUE | 2 |

FIG. 10

ACTIVE PEER TABLE
(ONE TABLE IS GENERATED FOR EACH FILE)

| CLIENT ADDRESS (IP, PORT) | SEEDER FLAG |
|---|---|
| 100. 0. 0. 2 | 1 |
| 200. 0. 0. 2 | 1 |
|  |  |
| ... | ... |
| TOTAL VALUE | n |

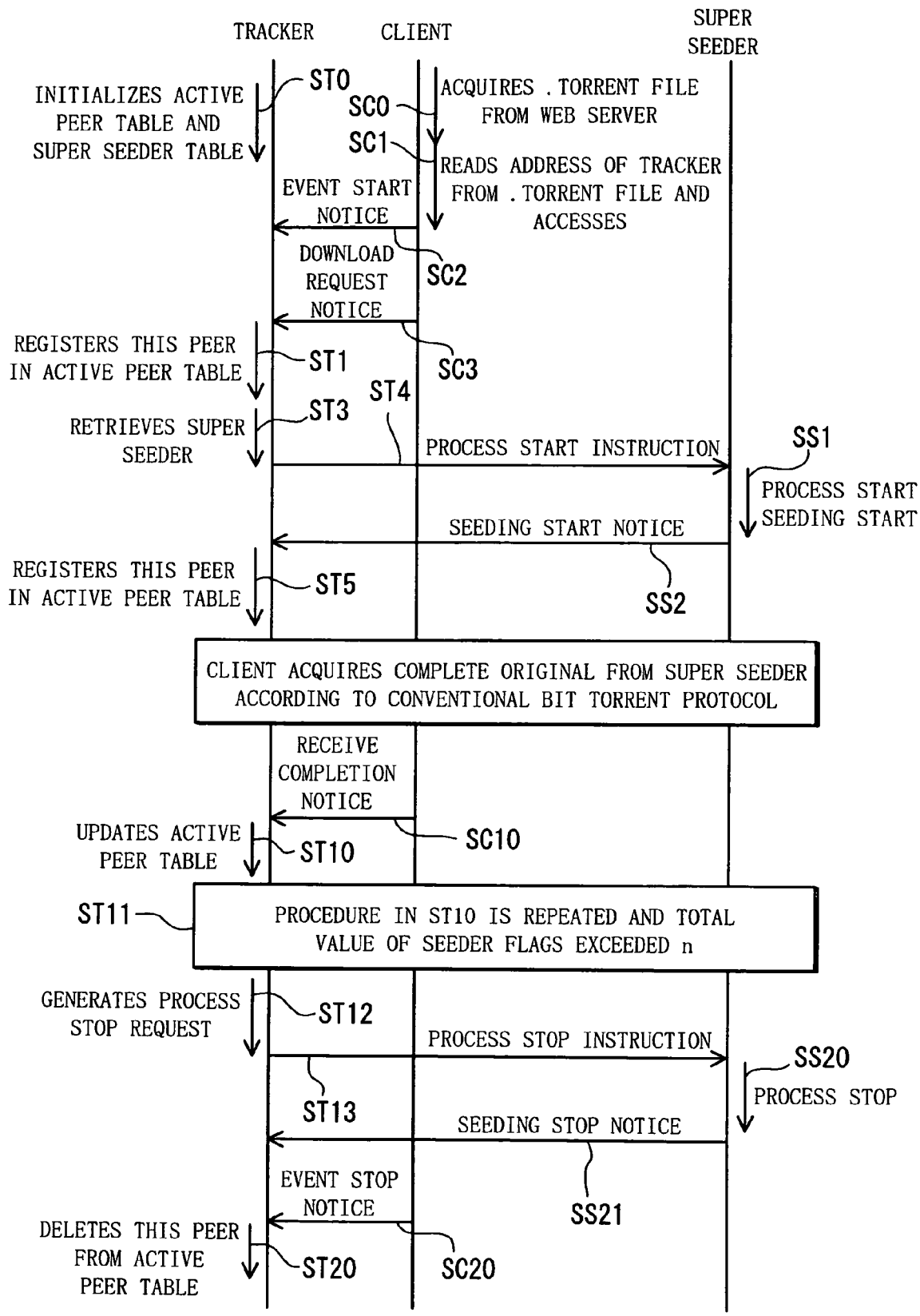

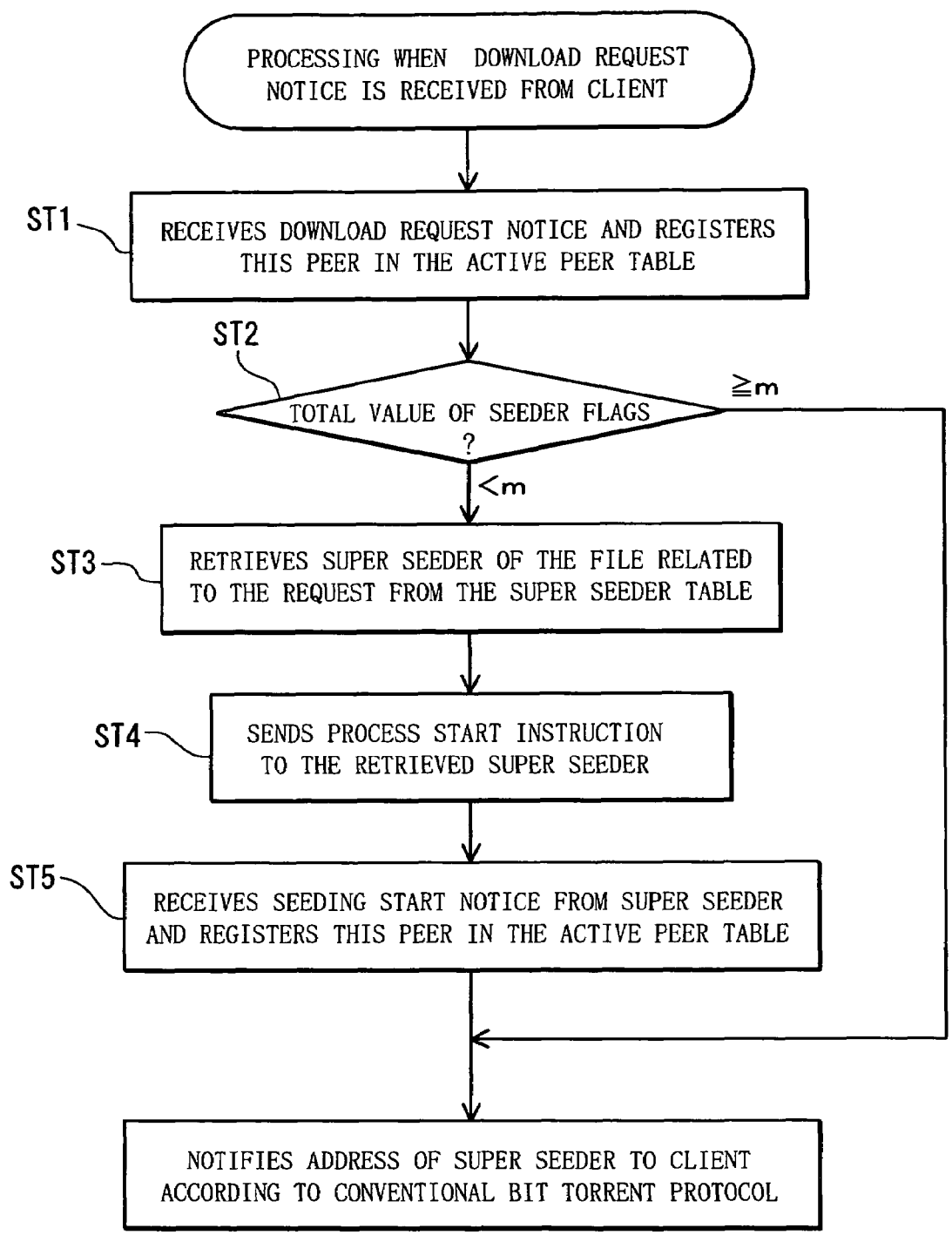

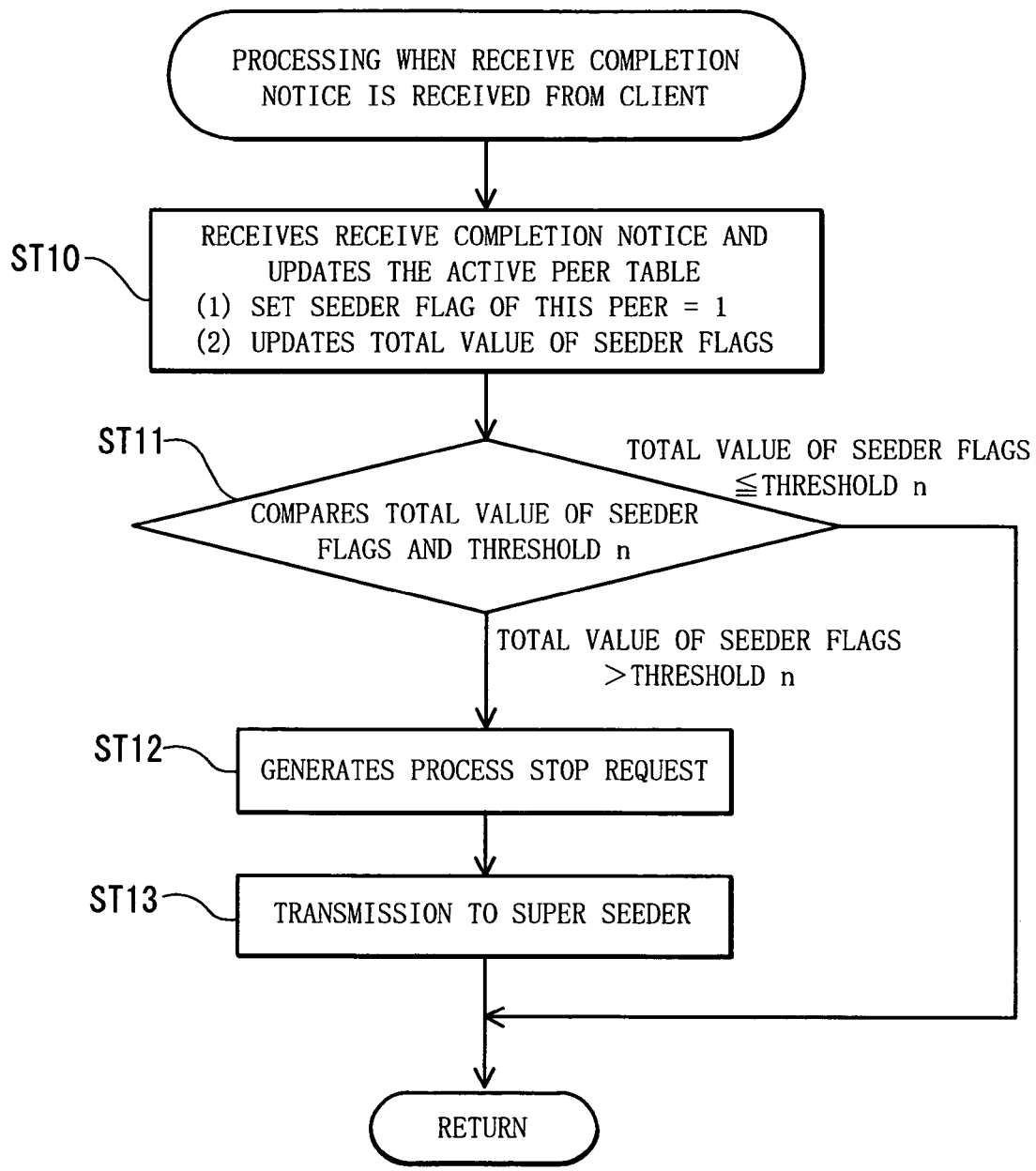

DOWNLOAD METHOD FOR FILE BY BIT TORRENT PROTOCOL

TECHNICAL FIELD

The present invention relates to an improvement of the Bit Torrent Protocol, which is one of P2P protocols (Peer-To-Peer, a method for clients to communicate with each other without passing through a server).

BACKGROUND ART

Prior Art (1)

A video file data distribution service using the Internet is being provided. FIG. 1 shows a diagram depicting this system, where data is directly distributed from a plurality of distribution servers 100 to client PCs (personal computers) 101 via the Internet 102.

The general protocols for distributing data in the system in FIG. 1 are as follows.

(1) http protocol (protocol used for a www server)
(2) ftp protocol (protocol used for a file server)
(3) rtsp protocol (real-time streaming protocol, protocol used for streaming formats)

The size of a video file is very large. If the file is a giga byte size, the load of the distribution server and the band consumption of the network lines are so large that it requires an enormous equipment investment and running cost if the data is distributed to many users simultaneously using a prior art.

In the above prior art (protocol), a server and a client PC (personal computer: viewer, user) are directly connected, and occupy the resources of the server and the line, so a cost in proportion to the number of users is required.

Prior Art (2)

One method to solve the above problem is a kind of P2P protocol (Peer-To-Peer, method for clients to communicate with each other without passing through a server) called the "Bit Torrent Protocol". As FIG. 2 shows, in this method files are transferred relaying packets from the server having the original file called a "super seeder" (also called the origin server) 110 as a start. Each server, which is called the leecher 111, distributes a portion, received as a piece seeder from the received portion, to other peers. A client which received at least a part of the file plays a role to distribute this portion, and is called the piece seeder. A peer which only receives is called a leecher hill 112. The leecher hill 112 responds to the client PC 101 in FIG. 1, and the piece seeder (leecher) 111 is the client PC 101 in FIG. 1, but also corresponds to the distribution server 100. The piece seeder (leecher) 111 transmits for the number of times of the reception, then the piece reaches to the last client. (Hereafter similar methods are collectively called the "Bit Torrent Method". "Packet relay distribution" is hereafter called the "grid distribution".)

The URL related to the Bit Torrent Method has the extension ".torrent". If this .torrent file is read by Bit Torrent-supported file sharing software, file sharing (download/upload of a file) starts. Even during the download of a file, the portion this client has downloaded thus far is uploaded when requested.

In theory a file reaches all the clients 111 and 112 if the seeder server 110 distributes the file once, regardless the number of clients, so the load on the seeder server 110 for one file is roughly constant regardless the number of clients. (In reality the distribution efficiency of an entire network is improved by executing not just once, but a plurality of times of distribution to a plurality of peers.)

FIG. 3 shows a diagram depicting a Bit Torrent system. To actually implement the Bit Torrent Method, a central control server called a tracker 120 exists to register and manage addresses of the peers (client PCs) P which participate in the grid distribution. The tracker server 120 receives a network participation request from each peer P, and creates a list of addresses (IP address and port) of the peers P which sent that request for each identifier (file ID) which uniquely specifies the file desired by a peer. This list is called the active peer table 120a (FIG. 4).

To participate in the network 121 in FIG. 3, the peer P first inquires the tracker server 120 to know the connection destination client of the grid distribution, and acquires the address of the connection destination peer P. At this time the address of the inquiry source peer P (IP address and port) and the identifier (file ID) which uniquely specifies the file desired by this peer P are registered in the active peer table 120a. The peer P which acquired the address of the connection destination by the response from the trackers server 120 connects with the corresponding peer P, and hereafter a packet relay type communication (grid distribution) is performed between the peers, as shown in FIG. 2. In FIG. 3, the bold line indicates the data communication and the fine line indicates the communication with the tracker server 120 for registration to the active peer table 120a.

The peer P is a client PC but can also be a seeder (seeder or piece seeder) as well. In other words, when a specific file is downloaded 100% (when file A or file B is downloaded 100% if one content file consists of file A and B), the client PC becomes a seeder, and is managed by the active peer table 120a as such. In the network 121 in FIG. 3, each node is indicated as "peer P" since whether the node is a seeder or not depends on the node. Each peer P of the network 121 is a seeder or a simple client (leecher) for a specific file. Status differs depending on the file and is not fixed, and a peer P that is a seeder for a specific file can be known by referring to the active peer table 120a.

DISCLOSURE OF THE INVENTION

In the Bit Torrent Method, a peer holding the original file does not always exist, so a seeder, which has a "complete original" (super seeder), must be active somewhere on the network as long as a leecher exists. In order to secure a "complete original", at least one super seeder, or a plurality of piece seeders sufficient for the result of collecting the piece seeders to be a complete original must be active. It is not possible to assure the number of active piece seeders, so one super seeder is always required for each file (content). The service provider must prepare such a super seeder.

Therefore the load of a super seeder increases in proportion to the number of types of original files, and not to the number of peers (number of users) (about a double load is applied to a seeder which distributes two types of files to one user, compared with a seeder which distributes one type of file to two users). This means that the Bit Torrent Method is suitable for distributing a small number of large files, but increases the load on the super seeder as the number of files increases, which increases the equipment investment and running cost.

With the foregoing in view, it is an object of the present invention to solve the above problems and to provide a method of decreasing the load on the super seeder when the number of files increases in the Bit Torrent Method.

The download method for a file, according to the present invention, is a download method for a file on a computer network comprising at least one client, a super seeder for transmitting a file stored in advance according to a request, and a tracker including an active peer table which is a table created for each file for storing at least the address of a client and/or a super seeder, a seeder flag for indicating whether a file stored by a computer at the address can be transmitted according to a request, and the number of computers that can transmit the stored file according to a request, and a super seeder table for storing the address of the super seeder, the method comprising a first step of sending an event start notice and a file download request notice from a client to a tracker, a second step of receiving the download request notice and registering the client in the active peer table corresponding to the file, a third step of retrieving an address of a super seeder corresponding to the file from a super seeder table when the number of computers that can transmit the file is a predetermined value m, which is set in advance, or less in the active peer table, a fourth step of sending a process start instruction from the tracker to the super seeder retrieved in the third step, a fifth step of receiving the process start instruction and starting the process by the super seeder, a sixth step of sending a seeding start notice from the super seeder to the tracker, a seventh step of receiving the seeding start notice and registering the super seeder in the active peer table, an eighth step of downloading the file from the super seeder to the client based on the active peer table, a ninth step of sending a receive completion notice from the client to the tracker, a tenth step of receiving the receive completion notice, setting a seeder flag of the client in the active peer table corresponding to the file, and updating the number of computers that can transmit the file, an eleventh step of comparing the number of computers that can transmit the file with a predetermined threshold n, a twelfth step of generating a process stop request when the number of computers that can transmit the file exceeds the threshold n, a thirteenth step of sending the process stop request to the super seeder included in the active peer table, and a fourteenth step of receiving the process stop request and stopping the process by the super seeder.

A program for implementing the above method is recorded on a recording medium, for example. The recording medium includes, for example, an EPROM device, flash memory device, flexible disk, hard disk, magnetic tape, magneto-optical disk, CD (including CD-ROM, Video-CD), DVD (including DVD-Video, DVD-ROM and DVD-RAM), ROM cartridge, RAM memory cartridge with backup battery, flash memory cartridge and non-volatile RAM cartridge.

The recording medium is a medium on which information (mainly digital data and programs) is recorded by a physical means, and which can have such a processor as a computer or a dedicated processor execute predetermined functions.

BRIEF DESCRIPTION OF THE DRAWINGS

FIG. 5 shows an active peer table according to an embodiment of the present invention;

FIG. 6 shows a super seeder table according to an embodiment of the present invention;

FIG. 7 shows an example of an active peer table for describing a protocol according to an embodiment of the present invention;

FIG. 8 shows an example of an active peer table for describing a protocol according to an embodiment of the present invention;

FIG. 9 shows an example of an active peer table for describing a protocol according to an embodiment of the present invention;

FIG. 10 shows an example of an active peer table for describing a protocol according to an embodiment of the present invention;

FIG. 11 is a flow chart depicting the download method for a file according to an embodiment of the present invention;

FIG. 12 is a flow chart depicting the processing method of a tracker according to an embodiment of the present invention; and FIG. 13 is a flow chart depicting the processing method of a tracker according to an embodiment of the present invention.

BEST MODE FOR CARRYING OUT THE INVENTION

Explanation of Terms

Peer: A computer constituting the P2P network. One peer is a node of the P2P network. Super seeder and piece seeder (leecher and leecher hill) are types of nodes respectively. A tracker is not included in a peer.

Server: A computer which provides its own functions and data to a client computer on the computer network. A server can also be a peer (e.g. super seeder).

Client: A computer which uses the functions and data provided by a server computer in the computer network. A client can also be a peer (e.g. piece seeder (leecher)).

Figure 1:
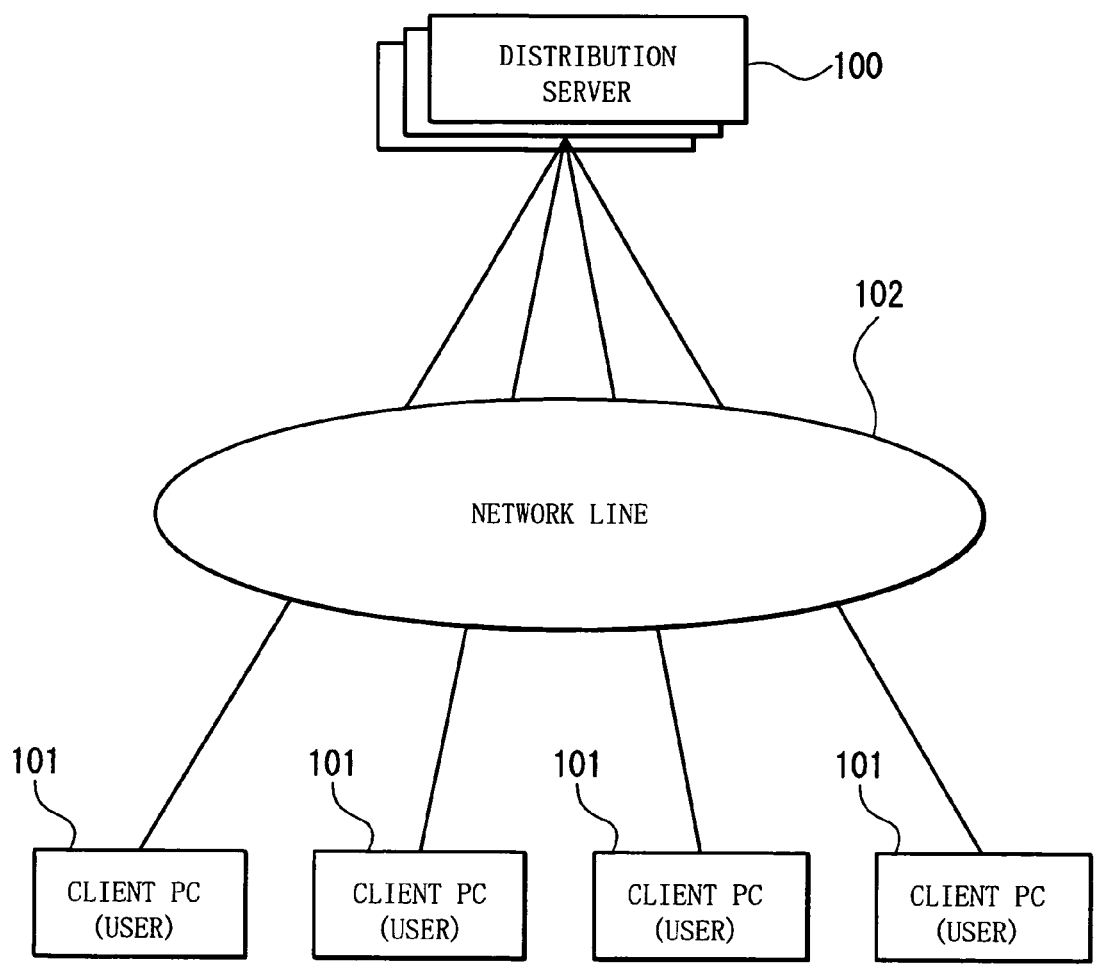
FIG. 1 is a diagram depicting a conventional file download.
Figure 2:
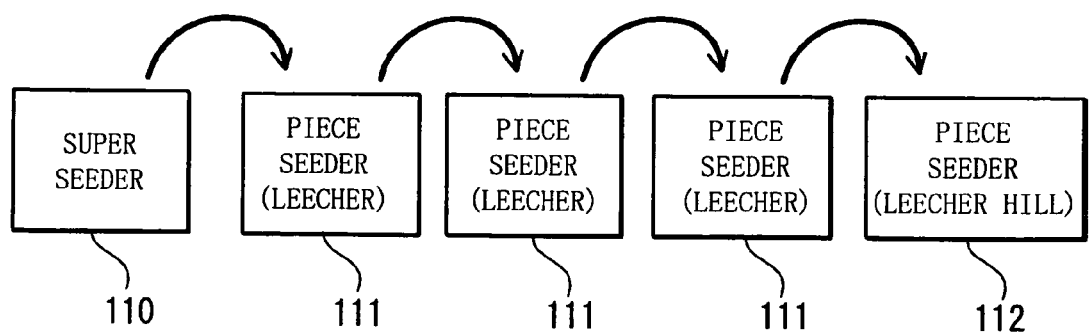
FIG. 2 is a diagram depicting the Bit Torrent protocol.
Figures 3, 4:
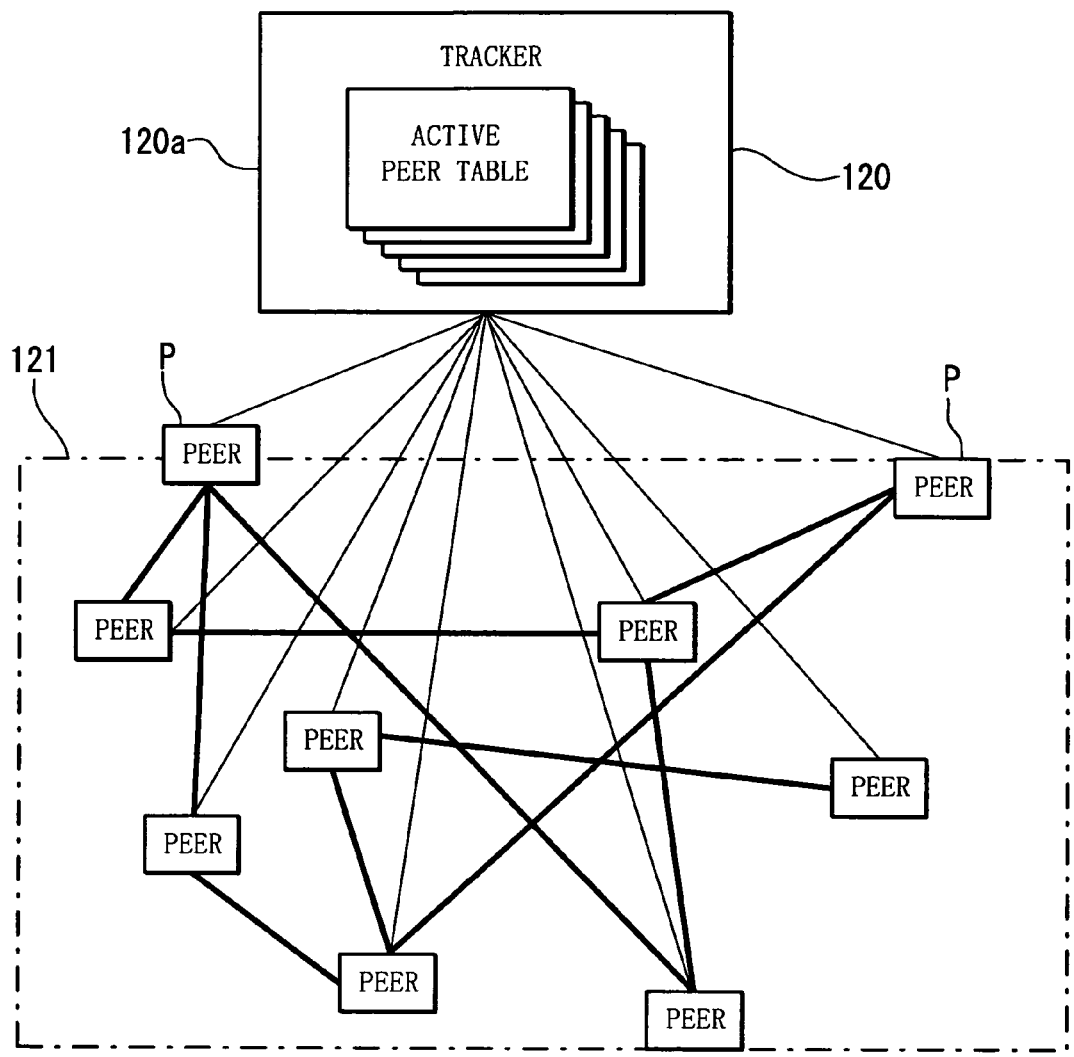
FIG. 3 is a diagram depicting the P2P network by the Bit Torrent protocol.
FIG. 4 shows an active peer table of the conventional Bit Torrent protocol.

A client constituting the P2P network according to an embodiment of the present invention may operate not only as a client which receives data, as mentioned above, but also as a server, such as a piece seeder. In the following description, the term "peer" is used when the configuration of the network is described (e.g. FIG. 3), and when the functions thereof are described, the peer which provides a service, such as data transmission, is called a "server", "super seeder" or "seeder", and the peer which receives the service is called a "client".

Terms specific to Bit Torrent will be described in brief.

(1) Torrent File

A file in which the file information and the address of the tracker are written. This file is acquired first to participate in the P2P network by Bit Torrent.

(2) Tracker

An important computer (server) which indicates the owner of a file. The Bit Torrent client is connected to the tracker, written in a .torrent file, and acquires the address of the owner of the file.

(3) Seeder

A client which completed a download, that is a peer that can upload. In Bit Torrent, a client which downloaded a part of a file can also upload this downloaded portion. This kind of peer is called a "piece seeder".

(4) Leecher

A client which has not completed a download.

The system/method according to an embodiment of the present invention provides a download service for a large size (heavy) file, such as a video file of a movie. Conventionally a video file is provided as a streaming type, but is provided as a download type in the system/method according to the present embodiment, which is called a file distribution server/client system. The video file provided by the system/method according to the present embodiment is an image file with a 1.5 Mbps or more bit rate (information volume per time of moving image data) based on a compression format called WMV9.

The improved active peer table (see FIG. 5) in which the active peer table of the tracker server is improved, and the super seeder table (see FIG. 6) which is newly developed are defined as follows.

(1) The improved active peer table is a list of peers which have this file or which are requesting reception (seeder or leecher). When each peer inquires the address of the connection destination of the packet relay to the tracker, the tracker operates such that a peer in this table is selected by a predetermined method (including by random selection), and the peer which inquired is replied to, so as to spread the grid distribution network (circle of packet relay).

(2) The super seeder table is a list wherein an address of a super seeder is corresponded to each file. The type of file provided by a super seeder is specified by the service ID (identification information of a file).

The system/method according to an embodiment of the present invention will now be described with reference to the diagrams in FIG. 7-FIG. 10 and the flow charts in FIG. 11-FIG. 13.

First the initial setup is performed (ST0, SC0, SC1 in FIG. 11). In the initial status, the active peer table is empty (FIG. 5). In the super seeder table, at least one address of a super seeder is registered for each service ID in advance. For example, it is assumed that the service IDs are defined as Corp1 and Corp 2, and in the Corp1 service the files A and B are distributed and in the Corp2 service the files C and D are distributed (FIG. 6). The service ID is managed for each source of the original file. The service ID is an ID for specifying the distribution source (super seeder) of the original file.

The client is activated in a status where [the client] does not have the file A. When activated, [the client] sends an event notice (session start) to the tracker (SC2 in FIG. 11), and notifies that the download of "service ID=Corp 1, file A" is desired in the following way, for example (SC3 in FIG. 11). This notice is in HTTP (S) protocol, for example.
GEThttp://trackerserver/
track.cgi?event=sessionstart&FILE=file
A&ServiceID=Corp1&Seeder=0.
"&ServiceID=Corp1&Seeder=0" is a new portion related to the present embodiment. The flag Seeder=0 attached to the end indicates that [the client] does not as yet have the file A. The service ID may be omitted if there is only one service ID.

The tracker which receives this [notice] reads the IP address of the client 1 and the port number from the IP packet header, and registers them in the active peer table as follows (ST1 in FIG. 7, FIG. 11 and FIG. 12).

The total value of the seeder flags is checked. If the total value of the seeder flags (number of computers which can transmit the file) is smaller than a predetermined value m (e.g. 2), which is set in advance, the super seeder is activated. For example, when the total value of the Seeder flags=0, that is when there is no peer which becomes a seeder, the super seeder is activated with certainty. The setting of the predetermined value m may be changed as a variable by a program. This is because the activation of the super seeder is theoretically unnecessary when "m=1", but it is possible that "peer with Seeder flag=1" becomes overloaded by the transmission requests concentrated there, although this depends on the conditions of the network, therefore as a buffer for this, it is preferable to activate the supper seeder and distribute the transmission requests if the number of seeders is low (even if it is not zero). Since the total value of the seeder flags of the active peer table is 0 (ST2<m in FIG. 12), the tracker activates the super seeder.

Specifically, a super seeder, of which the service ID=Corp 1, is searched in the super seeder table in FIG. 6 and this address is read from the super seeder table (ST3 in FIG. 11 and FIG. 12). If a plurality of super seeders are registered here, round robin scheduling is performed (an algorithm for scheduling in which the user list is repeatedly checked so that each user has a chance to use the central processing unit sequentially. For example, a previous select value is stored and the next column is sequentially selected). Here it is assumed that 200.0.0.2 is selected as an example.

Then the tracker sends the following process start instruction to the address of the selected super seeder using HTTP protocol, for example (ST4 in FIG. 11 and FIG. 12).
GEThttp://200.0.0.2/
seeder.cgi?event=seedingstart&FILE=fileA The super seeder server (200.0.0.2) which received this information starts the process of the seeder (SS1 in FIG. 11), and starts the seeding (supplying original) of file A. Specifically [the super seeder server] sends the request to the tracker with the seeder flag as 1 according to the same procedure as client 1 (SS2 in FIG. 11).

GEThttp://trackerserver/track.cgi?event=sessionstart&
serviceID=Corp1&FILE=fileA&Seeder=1
The service ID can be predetermined and set in advance for each super seeder.

The tracker which received this request registers it in the active peer table, as shown in FIG. 8. By this the client 1 can acquire the complete original since the seeder exists on the network.

When the client completes receiving, the client 1 sends the following receive completion notice to the tracker (SC10 in FIG. 11).

GEThttp://trackerserver/
track.cgi?event=sessioncomplete&servic
eID=Corp1&FILE=fileA&Seeder=1

"Seeder=1" at the end indicates that [the client 1] has a complete file.

The tracker which received this notice updates the active peer table, as shown in FIG. 9 (ST10 in FIG. 11 and FIG. 13).

As [processing] continues in the same manner, peers which completed reception increase, and the total value of the seeder flags eventually exceeds a predetermined value n (FIG. 10). The value n can be set in the tracker server in advance.

The total value of the seeder flags, which exceeds a predetermined value or more, indicates that a seeder which has a complete original file (not only the super seeder but also a general piece seeder which completed reception) exists on the network, in addition to the super seeder. This means that an arbitrary client can receive a complete original file from another seeder even if a super seeder does not exist, so the super seeder can be stopped.

Therefore when the total value of the seeder flags exceeds n (total value of seeder flag>threshold n in ST11 in FIG. 13), the tracker sends the following process stop request to the activated super seeder (ST12 in FIG. 11 and FIG. 13), GEThttp://200.0.0.2/seeder.cgi?FILE=fileA&event=seedingstop The super seeder which received this stops the seeding process of the file A (SS20 in FIG. 11).

If no transmission request for the file A is received from any client for a predetermined period (e.g. 120 seconds) or more, the super seeder automatically stops the seeding process of the file A, even if an instruction is not received from the tracker. At this time [the super seeder] notifies a stop of the seeding to the tracker as follows (SS21 in FIG. 11).

GEThttp://trackerserver/track.cgi?event=sessionstop&serviceID=Corp1&FILE=fileA&Seeder=1

The tracker which received "event=sessionstop" from a seeder or an arbitrary client deletes the peer from the active peer table.

In the present embodiment a seeder flag is set in the improved active peer table, and the start/stop of the super seeder is executed depending on whether the total value thereof is at a certain level, so that the super seeder is dynamically started only when the seeders having the complete original of a certain file A are insufficient on the network, and is dynamically stopped when excessive, therefore the required number of activated processes of the super seeder can be decreased as a whole, and as a result the load on the super seeder(s) can be decreased.

By registering a plurality of seeders in the super seeder table in advance and performing round robin scheduling on them, the load on a super seeder can be distributed to a plurality of servers even if a separate load distribution device is not used.

Also by setting an identifier for each service ID in the super seeder table, and registering the address of each super seeder for the service ID in advance, the seeder can be dynamically switched for each service ID, that is for each supplier of the content, and the physical locations of the super seeders can be distributed throughout the world.

The present invention is not limited to the above embodiment, but can be modified in various ways within the scope of the invention stated in the Claims, and needless to say these shall be included in the scope of the present invention.

The invention claimed is:

1. A download method for a file in a computer network comprising at least one client, a super seeder for transmitting a file stored in advance according to a request, and a tracker including an active peer table which is a table created for each file for storing at least an address of a client and/or a super seeder, a seeder flag for indicating whether a file stored by a computer at said address can be transmitted according to a request, and the number of computers that can transmit the stored file according to a request, and a super seeder table for storing the address of the super seeder, said tracker being a central control server that registers and manages addresses of the clients that participate in the computer network, the method comprising:

a first step of sending an event start notice and a file download request notice from a client to a tracker;

a second step of said tracker receiving said download request notice and registering said client in the active peer table corresponding to said file;

a third step of said tracker retrieving an address of a super seeder from said super seeder table when the number of computers that can transmit said file is a predetermined value m, which is set in advance, or less in said active peer table;

a fourth step of sending a process start instruction from the tracker to the super seeder retrieved in said third step;

a fifth step of receiving said process start instruction and starting the process by said super seeder;

a sixth step of sending a seeding start notice from said super seeder to the tracker;

a seventh step of said tracker receiving said seeding start notice and registering said super seeder in said active peer table;

an eighth step of downloading said file from said super seeder to said client based on said active peer table;

a ninth step of sending a receive completion notice from the client to the tracker;

a tenth step of said tracker receiving said receive completion notice and setting a seeder flag of said client in the active peer table corresponding to said file, and updating the number of computers that can transmit said file;

an eleventh step of said tracker comparing the number of computers that can transmit said file with a predetermined threshold n;

a twelfth step of said tracker generating a process stop request when the number of computers that can transmit said file exceeds the threshold n;

a thirteenth step of said tracker sending said process stop request to the super seeder included in said active peer table; and a fourteenth step of receiving said process stop request and stopping the process by the super seeder.

2. The download method for a file according to claim 1, further comprising a fifteenth step of sending a seeding stop notice from said super seeder to the tracker, and a sixteenth step of receiving said seeding stop notice and deleting said super seeder from said active peer table.

3. The download method for a file according to claim 1, characterized in that when a plurality of super seeders are registered in said super seeder table, addresses of the plurality of super seeders are selected according to a round robin scheduling in said third step.

4. The download method for a file according to claim 1, characterized in that said super seeder table stores identification information for the file stored by the super seeder along with the address of the super seeder, and the address of the super seeder corresponding to said file is retrieved from said super seeder table based on said identification information in said third step.

5. A processing method for a tracker server providing an active peer table which is a table created for each file for storing at least an address of a client and/or a super seeder, a seeder flag for indicating whether a file stored by a computer at said address can be transmitted according to a request, and the number of computers that can transmit the stored file according to a request, and a super seeder table for storing the address of a super seeder which transmits a file, which is stored in advance, according to a request, said tracker being a central control server that registers and manages addresses of the clients that participate in a computer network, the method comprising the steps of:

receiving a download request notice for a file from a client, and registering said client in the active peer table corresponding to said file;

acquiring the number of computers that can transmit said file from said active peer table;

retrieving an address of a super seeder from said super seeder table when the number of said computers is a predetermined value m, which is set in advance, or less;

sending a process start instruction to the retrieved super seeder;

receiving a seeding start notice from said super seeder and registering said super seeder in said active peer table;

receiving a receive completion notice from said client and setting the seeder flag of said client in the active peer table corresponding to said file, and updating the number of computers that can transmit said file;

comparing the number of said computers with a predetermined threshold n;

generating a process stop request when the number of said computers exceeds the threshold n; and sending said process stop request to a super seeder included in said active peer table.

6. The processing method for a tracker server according to claim 5, characterized in that when a plurality of super seeders are registered in said super seeder table, the addresses of the plurality of super seeders are selected according to a round robin scheduling in the step of retrieving the address of the super seeder from said super seeder table.

7. The processing method for a tracker server according to claim 5, characterized in that said super seeder table stores identification information for the file stored by the super seeder along with the address of the super seeder, and the address of the super seeder corresponding to said file is retrieved from said super seeder table based on said identification information in the step of retrieving the address of the super seeder from said super seeder table.

8. A storage medium storing a program for constructing a tracker server of the Bit Torrent protocol for providing a computer an active peer table which is a table created for each file for storing at least an address of a client and/or a super seeder, a seeder flag for indicating whether a file stored by a computer of said address can be transmitted according to a request, and the number of computers that can transmit the stored file according to a request, and a super seeder table for storing the address of a super seeder which transmits a file, which is stored in advance, according to a request, said tracker being a central control server that registers and manages addresses of the clients that participate in a computer network, and causing the computer to execute the steps of:

receiving a download request notice for a file from a client, and registering said client in the active peer table corresponding to said file;

acquiring the number of computers that can transmit said file from said active peer table;

retrieving an address of a super seeder from said super seeder table when the number of said computers is a predetermined value m, which is set in advance, or less;

sending a process start instruction to the retrieved super seeder;

receiving a seeding start notice from said super seeder and registering said super seeder in said active peer table;

receiving a receive completion notice from said client and setting the seeder flag of said client in the active peer table corresponding to said file, and updating the number of computers that can transmit said file;

comparing the number of said computers with a predetermined threshold n;

generating a process stop request when the number of said computers exceeds the threshold n; and sending said process stop request to a super seeder included in said active peer table.

9. A tracker server of the Bit Torrent protocol comprising an active peer table which is a table created for each file for storing at least an address of a client and/or a super seeder, a seeder flag for indicating whether a file stored by a computer at said address can be transmitted according to a request, and the number of computers that can transmit the stored file according to a request, a super seeder table for storing the address of a super seeder which transmits a file, which is stored in advance, according to a request, and a processing unit, said tracker being a central control server that registers and manages addresses of the clients that participates in a computer network, characterized in that said processing unit:

receives a download request notice for a file from a client, and registers said client in the active peer table corresponding to said file;

acquires the number of computers that can transmit said file from said active peer table;

retrieves an address of a super seeder from said super seeder table when the number of computers is a predetermined value m, which is set in advance, or less;

sends a process start instruction to the retrieved super seeder;

receives a seeding start notice from said super seeder and registers said super seeder in said active peer table;

receives a receive completion notice from said client, sets the seeder flag of said client in the active peer table corresponding to said file, and updates the number of computers that can transmit said file;

compares the number of said computers with a predetermined threshold n;

generates a process stop request when the number of said computers exceeds the threshold n; and sends said process stop request to a super seeder included in said active peer table.

* * * * *